United States Patent [19]

Cox et al.

[11] Patent Number: 5,597,511
[45] Date of Patent: Jan. 28, 1997

[54] PHOSPHOR AND METHOD OF MAKING SAME

[75] Inventors: James R. Cox, Monroeton; Ru-Yi Qi; Ronald E. Karam, both of Towanda, all of Pa.

[73] Assignee: Osram Sylvania Inc., Danvers, Mass.

[21] Appl. No.: 425,849

[22] Filed: Apr. 20, 1995

Related U.S. Application Data

[63] Continuation-in-part of Ser. No. 189,012, Jan. 28, 1994, abandoned, which is a continuation-in-part of Ser. No. 999,637, Dec. 31, 1992, abandoned.

[51] Int. Cl.$^6$ ............................ C09K 11/61; C09K 11/59
[52] U.S. Cl. ............................ 252/301.4 R; 252/301.4 H
[58] Field of Search ................ 502/84; 423/332, 423/331, 328.1, 328.2, 328.3; 252/301.4 H, 301.4 R, 201.4 R; 106/417, 415

[56] References Cited

U.S. PATENT DOCUMENTS

| | | | |
|---|---|---|---|
| 2,704,261 | 3/1955 | Comeforo | 423/331 |
| 2,987,777 | 6/1961 | Beaver et al. | 423/331 |
| 3,149,947 | 9/1964 | Eppler et al. | 65/33 |
| 3,149,982 | 9/1964 | Eppler | 106/39 |
| 5,032,547 | 7/1991 | Giannelis et al. | 252/512 |
| 5,185,180 | 2/1993 | Kasenga et al. | 427/67 |
| 5,306,441 | 4/1994 | Reddy et al. | 252/301.4 F |

FOREIGN PATENT DOCUMENTS 2307863  12/1976  France .

OTHER PUBLICATIONS

W. Eitel, R. Hatch, M. Denny, J. Amer. Cer., Soc., 36, 341–348 (1953) Oct.

K. Kuroda, M. Ogawa, T. Yanagisawa, & C. Kato, Layered Inorganic–Organic Nanocomposites: Application to Photofunctional Materials and Conversion to Inorganic Microporous Materials, Nanophase and Nanocomposite Materials Symposium, Dec. 1–3 1992, Boston, MA, pp. 335–347.

K. Kitajima, K. Miyaka, & N. Takusagawa, Changes in Swelling Characteristics and Structure of Na–Fluorine Micas with Ga–and Al–Substitutions, J. Ceramic. Soc. Jpn. Int. Ed., 1991, 99(12), pp. 1174–1182.

K. Kitajima and N. Daimon, Synthesis of Na–Fluor–Tetrasilicic Mica [NaMg$_{2.5}$(Si$_4$O$_{10}$)F$_2$] and its Swelling Characteristics, Nippon Kagaku Kaishi, (6), pp. 991–995 (1975).

V. Luca, X. Chen, & L. Kevan, Chem. Mater. 3, pp. 1073–1081 (1991).

H. Shell and K. Ivey, Fluoromicas, Bureau of Mines, U.S. Dept. of Interior Bulletin 647, pp. 123–144 (1969).

*Primary Examiner*—Melissa Bonner
*Attorney, Agent, or Firm*—Robert F. Clark

[57] ABSTRACT

Inorganic intercalation phosphors were made by doping an inorganic intercalation compound having an atomic structure interspersed with vacant spaces with selected activator ions capable of luminescent emission when excited by ultraviolet light and/or cathode rays.

7 Claims, 1 Drawing Sheet

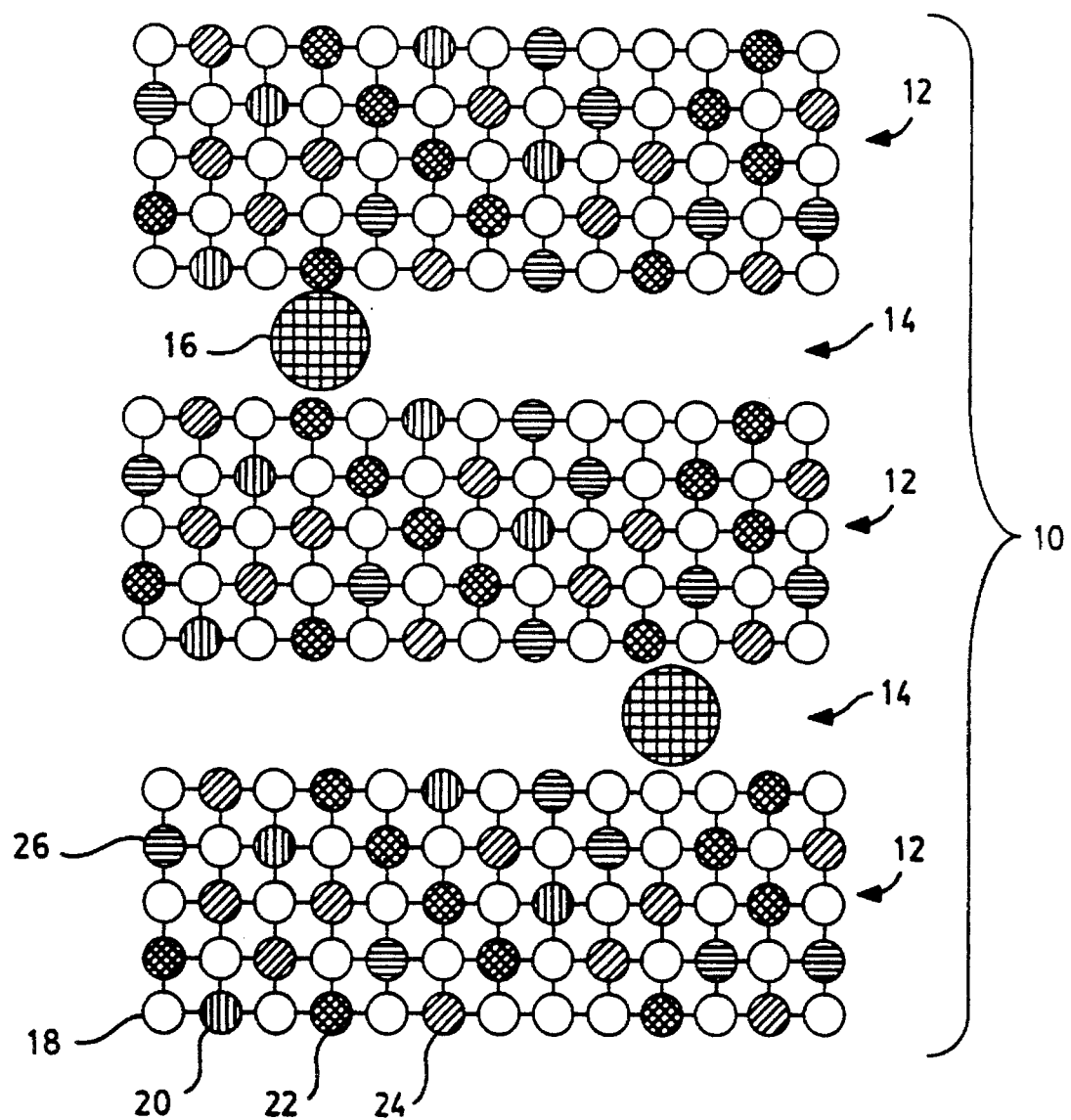

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a continuation-in-part of application Ser. No. 08/189,012, filed Jan. 28, 1994, now abandoned, which is a continuation-in-part of application Ser. No. 07/999,637, filed Dec. 31, 1992, now abandoned the disclosures of which are hereby incorporated by reference. This application is related to copending applications Ser. Nos. 08/425,848, 08/425,536, and 08/425,535, all filed Apr. 20, 1995.

TECHNICAL FIELD

This invention relates to phosphors and methods of making them. In particular, it relates to inorganic intercalation phosphors made by doping inorganic intercalation compounds with selected activator ions which, when excited by ultraviolet light, cathode rays or other exciting radiation, are capable of luminescent emission.

BACKGROUND ART

In present day society, there exist numerous applications for phosphors. For example, phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For lighting applications, it is desirable that phosphors luminesce when stimulated by ultraviolet radiation (UV), which is generally defined as the portion of the electromagnetic spectrum between about 4–400 nm. Such UV excitable phosphors are defined as being photoluminescent. Photoluminescent phosphors find use in a number of different lamp types including fluorescent, high pressure mercury and neon sign lamps. For fluorescent lighting applications, it is particularly important that phosphors be stimulable by the primary ultraviolet emissions from low pressure mercury discharges which occur at 185 and 254 nm.

For cathode ray tube applications, it is necessary that phosphors luminesce when excited by cathode ray radiation (CR), which consists of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors.

Finally, most phosphors which are cathodoluminescent and/or photoluminescent are also electroluminescent and would likely be usable in electroluminescent devices. Thus, it would be an advantage in the art to provide novel phosphors which are capable of luminescent emission when excited by either ultraviolet radiation or cathode rays or both.

SUMMARY OF THE INVENTION

It is an object of this invention to provide an inorganic intercalation phosphor capable of luminescent emission when excited by ultraviolet and/or cathode rays.

It is a further object of this invention to provide a method for producing an inorganic intercalation phosphor.

In accordance with one aspect of the invention, there are provided inorganic intercalation phosphors having the general formulas $(2NaF)(NaMg_3AlSi_3O_{10}F_2):Tb_x$, where x is from about 0.03 to about 0.15, and $Na_2[Mg_{3-x},Mn_x]Al_2Si_2O_{10}F_2$, where x is from about 0.0025 to about 0.10.

In accordance with another aspect of the invention, there are provided inorganic intercalation phosphors having the general formulas $(2NaF)(NaMg_3AlSi_3O_{10}F_2):Tb_x$ where x is about 0.09 and $Na_2[Mg_{3-x}, Mn_x]Al_2Si_2O_{10}F_2$ where x is about 0.02.

BRIEF DESCRIPTION OF THE DRAWINGS

The FIGURE is a schematic diagram representing the approximate atomic structure of fluorophlogopite, an inorganic intercalation compound.

BEST MODE FOR CARRYING OUT THE INVENTION

For a better understanding of the present invention, together with other and further objects, advantages and capabilities thereof, reference is made to the following specification and appended claims.

Numerous inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

The figure is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosilicate intercalation compounds having an atomic structure which is interspersed with networks of channels and/or cages filled with exchangeable cations and water. Zeolites have the general formula $M_xD_y(Al_{x+2y}Si_{n-(x+2y)}O_{2n}) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

| ACTIVATOR ION DOPANTS AND THEIR EMISSION COLORS | | |
|---|---|---|
| RED | GREEN | BLUE |
| $Mn^{+2}$ | $Mn^{+2}$ | $Sb^{+3}$ |
| $Mn^{+4}$ | $Eu^{+2}$ | $Ti^{+4}$ |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites within the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation, to determine its luminescence intensity and its emission color. Luminescence intensity of the doped inorganic intercalation compound may be optimized by varying the amounts of the desired dopant ions.

Two luminescent forms of fluorophlogopite have been made. The first is a terbium-activated phosphor based on a modified form of sodium fluorophlogopite and has the general formula $(2NaF)(NaMg_3AlSi_3O_{10}F_2):Tb_x$. A properly charge balanced formula for this phosphor could be written as $(2NaF)(NaMg_{3-1.5x}Tb_xAlSi_3O_{10}F_2)$ illustrating the belief that terbium is substituting for magnesium in the fluorophlogopite lattice. The second luminescent form of fluorophlogopite is a manganese-activated phosphor based on a highly charged fluorophlogopite (HCFP) and has the general formula $Na_2[Mg_{3-x}Mn_x]Al_2Si_2O_{10}F_2$. Both of these phosphors were prepared by a solid state method wherein stoichiometric quantities of the raw materials, MgO, $Al_2O_3$, $SiO_2$, $Na_2CO_3$, $Na_2SiF_6$ or $(NH_4)_2SiF_6$, and $Tb_4O_7$ or $MnCO_3$, were fired at between about 700° C. to about 1300° C. for between about 12 hours to about 24 hours. The manganese-activated phosphor was further fired in a reducing atmosphere of 95% $N_2$/5% $H_2$ in order to reduce any $Mn^{4+}$ to $Mn^{2+}$.

The following non-limiting examples are presented. Typical UV excitation was performed with the 254 nm line from a mercury discharge. Cathode ray excitation was typically performed using a focused high energy electron beam at 10 kV, 10 uA or 15 kV, 8 uA. Brightness measurements are in foot-Lamberts (fL).

EXAMPLES 1–5

Terbium-activated modified sodium fluorophlogopite phosphors having an approximate general formula $(2NaF)(NaMg_3AlSi_3O_{10}F_2):Tb_x$, where x is from about 0.03 to about 0.15, were prepared by mixing appropriate amounts of MgO, $Al_2O_3$, $SiO_2$, $Na_2CO_3$, $Na_2SiF_6$, and $Tb_4O_7$ on a paint-shaker for 40 minutes. The starting materials thus mixed were charged into 100 ml alumina crucibles and fired using the following temperature program: increasing the temperature from 700° C. to 1300° C. in 4 hours; holding at 1300° C. for 2 hours; decreasing the temperature to 925° C. in 3 hours; holding at 925° C. for 10 hours; and decreasing to 700° C. in 3 hours. The amounts of these starting materials are given the table below. The amounts of magnesium oxide used in the activated samples are slightly less than the stoichiometric amount dictated by the formula. The formation of the modified fluorophlogopite was confirmed by x-ray diffraction. Several phosphors having Tb activator levels between 0.00 and 0.15 moles of Tb per mole phosphor were prepared.

|  | Example 1 | Example 2 | Example 3 | Example 4 | Example 5 |
|---|---|---|---|---|---|
| $SiO_2$ (g) | 5.73 | 5.73 | 5.73 | 5.73 | 5.73 |
| $Al_2O_3$ (g) | 2.08 | 2.08 | 2.08 | 2.08 | 2.08 |
| Mgo (g) | 4.94 | 4.80 | 4.65 | 4.50 | 4.20 |
| $Na_2CO_3$ (g) | 3.61 | 3.61 | 3.61 | 3.61 | 3.61 |
| $Na_2SiF_6$ (g) | 5.13 | 5.13 | 5.13 | 5.13 | 5.13 |
| $Tb_4O_7$ (g) | 0 | 0.2293 | 0.4586 | 0.6879 | 1.1465 |
| (moles Tb/mole phosphor) | (0.00) | (0.03) | (0.06) | (0.09) | (0.15) |
| CR Brightness (foot-lamberts) | 0.06 | 0.62 | 0.19 | 2.60 | 1.20 |

The Tb-activated modified fluorophlogopite phosphor samples exhibited a green emission, typical for $Tb^{3+}$, under either UV or cathode ray excitation. The major emission peak was centered at 550 nm. The optimum CR brightness, 2.6 fL, was achieved at an activator level of 0.09 moles of Tb per mole phosphor. No appreciable luminescence was observed from the unactivated sample.

EXAMPLES 6–10

Manganese-activated Highly Charged Fluoropholgopite (HCFP) phosphors having the general formula $Na_2[Mg_{3-x}Mn_x]Al_2Si_2O_{10}F_2$ were synthesized by standard high-temperature solid-state synthetic methods. The general formula, $Na_2[Mg_{3-x},Mn_x]Al_2Si_2O_{10}F_2$, illustrates that it is believed that Mn is substituting for Mg in the HCFP lattice. Reagent mixtures were prepared by blending stoichiometric quantities of sodium carbonate ($Na_2CO_3$), magnesium oxide (MgO), aluminum oxide ($Al_2O_3$), ammonium hexafluorosilicate ($(NH_4)_2SiF_6$), silicon dioxide ($SiO_2$), and manganese carbonate ($MnCO_3$). Starting reagents were blended together for 20–30 minutes on a mechanical mixer. The mixtures were placed into alumina (or zirconia) crucibles and fired at 1100° C. for 12–24 hours followed by grinding to break up sintered cakes. Samples were then fired at 850° C. for 314 5 hours in a reducing atmosphere of 95% $N_2$ and 5% $H_2$, pulverized, and sieved (if necessary). Each sample was analyzed by X-ray powder diffraction to confirm the presence of HCFP. Phosphors having Mn concentrations of $0.00 \leq x \leq 0.10$ were prepared.

|  | Example 6 | Example 7 | Example 8 | Example 9 | Example 10 |
|---|---|---|---|---|---|
| $Na_2CO_3$ (g) | 12.41 | 12.40 | 12.40 | 12.36 | 12.32 |
| MgO (g) | 14.15 | 14.10 | 14.05 | 13.82 | 13.59 |
| $Al_2O_3$ (g) | 11.94 | 11.93 | 11.92 | 11.89 | 11.85 |
| $(NH_4)_2SiF_6$ (g) | 6.95 | 6.95 | 6.95 | 6.92 | 6.90 |
| $SiO_2$ (g) | 11.75 | 11.74 | 11.71 | 11.70 | 11.66 |
| $MnCO_3$ (g) | 0.034 | 0.134 | 0.269 | 0.804 | 1.336 |
| moles Mn/mole phosphor | 0.0025 | 0.010 | 0.02 | 0.06 | 0.10 |
| CR Brightness (foot-Lamberts) | 0.79 | 1.22 | 2.04 | 1.43 | 0.69 |

Under UV photo-excitation (254 nm), Mn-activated HCFP displayed essentially no luminescence. Emission from CR excited samples was red with a broad band centered at approximately 700 nm. Un-activated samples of HCFP (i.e., without Mn) exhibited little or no emission under UV or CR excitation.

While there have been shown what are at present considered to be the preferred embodiments of the invention, it will be apparent to those skilled in the art that various changes and modifications can be made herein without departing from the scope of the invention as defined by the appended claims.

We claim:

1. A phosphor having a general formula $(2NaF)(NaMg_3AlSi_3O_{10}F_2):Tb_x$, where x is from about 0.03 to about 0.15.

2. The phosphor of claim 1 wherein x is about 0.09.

3. A phosphor having a general formula $Na_2[Mg_{3-x},Mnx]Al_2Si_2O_{10}F_2$, where x is from about 0.0025 to about 0.10.

4. The phosphor of claim 3 wherein x is about 0.02.

5. A method of making a phosphor having a general formula $Na_2(Mg_{3-x},Mn_x)Al_2Si_2O_{10}F_2$ where x is from about 0.0025 to about 0.10 comprising the steps of forming a mixture of stoichiometric amounts of MgO, $Al_2O_3$, $SiO_2$, $Na_2CO_3$, $Na_2SiF_6$ or $(NH_4)_2SiF_6$, and $MnCO_3$ and firing the mixture at between about 700° C. to about 1300° C. for between about 12 hours to about 24 hours.

6. The method of claim 5 wherein the phosphor is refired in a reducing atmosphere containing 95% $N_2$ and 5% $H_2$.

7. A method of making a phosphor having a general formula $(2NaF)(NaMg_3AlSi_3O_{10}F_2):Tb_x$ where x is from about 0.03 to about 0.15 comprising the steps of forming a mixture of stoichiometric amounts of MgO, $Al_2O_3$, $SiO_2$, $Na_2CO_3$, $Na_2SiF_6$ or $(NH_4)_2SiF_6$, and $Tb_4O_7$ and firing the mixture at between about 700° C. to about 1300° C. for between about 12 hours to about 24 hours.

* * * * *